United States Patent [19]

Kumura et al.

[11] Patent Number: 5,663,857
[45] Date of Patent: Sep. 2, 1997

[54] MAGNETIC HEAD

[75] Inventors: Tatsuo Kumura; Fusashige Tokutake; Akira Urai; Junichi Honda; Hideaki Ojima, all of Miyagi, Japan

[73] Assignee: Sony Corporation, Tokyo, Japan

[21] Appl. No.: 695,757

[22] Filed: Aug. 8, 1996

Related U.S. Application Data

[63] Continuation of Ser. No. 380,811, Jan. 30, 1995, abandoned.

[30] Foreign Application Priority Data

Feb. 10, 1994 [JP] Japan .................. 6-016047

[51] Int. Cl.$^6$ ................................. G11B 5/31
[52] U.S. Cl. ................................. 360/126
[58] Field of Search ................................. 360/126

[56] References Cited

U.S. PATENT DOCUMENTS 4,608,297  8/1986  Shimada et al. .................. 360/126
5,104,739  4/1992  Hirota et al. .................. 360/126

*Primary Examiner*—Robert S. Tupper
*Attorney, Agent, or Firm*—Hill, Steadman & Simpson

[57] ABSTRACT

A magnetic head comprising a pair of magnetic core halves each having a magnetic core film sandwiched between a pair of non-magnetic substrates, said magnetic core halves being abutted to each other with the end faces of the magnetic core films facing each other, with a magnetic gap being defined in an interface of abutment of said magnetic core films, wherein the magnetic core film is of a laminated magnetic film structure comprising a plurality of laminated magnetic film units laminated with insulating films in-between. Each laminated magnetic film unit in turn comprises a plurality of magnetic films with non-magnetic films in-between, with the magnetic films being magnetostatically connected to one another at film ends. By employing the laminated magnetic film unit for the magnetic core film, it becomes possible to markedly increase the magnetic permeability in a direction normal to the gap depth when anisotropy is applied in the gap depth direction. With the above magnetic head, a plurality of the magnetic film units are laminated with insulating films in-between for suppressing eddy current losses in the high frequency region. As a result, excellent electro-magnetic transducing characteristics may be obtained in the high frequency range.

10 Claims, 9 Drawing Sheets

MAGNETIC HEAD

This is a continuation of application Ser. No. 08/380,811, filed Jan. 30, 1995 now abandoned.

BACKGROUND OF THE INVENTION

This invention relates to a so-called laminated magnetic head and, more particularly, to improvement in electromagnetic transducing characteristics in the laminated magnetic head.

In a magnetic recording/reproducing apparatus, such as a video tape recorder (VTR), attempts are being made for increasing the density and the frequency of recording signals. In keeping up with such attempts, a so-called metal tape employing magnetic metal powders, such as Fe, Co or Ni powders, and an evaporated tape, in which a magnetic metal material is directly deposited by evaporation on a base film, are being used in increasing numbers.

Since this type of the magnetic recording medium has high residual magnetic flux density Br and high coercivity Hc, it is demanded of the material of the magnetic head employed for recording and playback to have high saturation magnetic flux density Bs and high permeability.

In keeping with the tendency towards high density recording, attempts are being made to narrow the recording track width on the magnetic recording medium and accordingly an extremely narrow track width of the magnetic head is required.

Thus a so-called laminated magnetic head has been proposed, in which magnetic core halves comprising a magnetic core film sandwiched between a pair of non-magnetic substrates are abutted to each other with the end faces of the magnetic core films facing each other, with the interface between the magnetic core films defining a magnetic gap. With the laminated magnetic head, since the substrates on either sides of the magnetic core film are of the non-magnetic material, the track width is determined by the film thickness of the magnetic core film. Thus the track width can be narrowed easily by controlling the film thickness of the magnetic core film.

Meanwhile, since magnetic permeability within the film plane of the magnetic core film directly influences the performance of the magnetic head, it is crucial to control the state of magnetization of the magnetic core film surface in order to improve electro-magnetic transducing characteristics of the magnetic head.

According to the results of analyses of the magnetic path, as reported in Extended Abstract of the 11th Meeting of the Society of Applied Magnetic Engineering of Japan, it is necessary that the relation $\mu x > \mu y$ be met, where $\mu y$, $\mu x$ stand for the magnetic permeability in a direction parallel to the gap depth within the film surface of the magnetic core film and the magnetic permeability in a direction normal to the gap depth, respectively.

In order for the relation $\mu x > \mu y$ to hold, it suffices if the gap depth direction is the easy axis of magnetization.

However, with the laminated head for high density recording, the gap depth and the track width are narrow and on the order of tens of μm. The magnetic gap having such narrow gap depth and track width exhibits shape anisotropy which renders the gap depth direction into the direction of hard magnetization. Thus the diamagnetic field becomes extremely strong when the magnetization is oriented along the gap depth.

Consequently, even if anisotropy is applied so that the easy axis runs parallel to the gap depth, the magnetic domain structure is significantly affected by shape anisotropy, if the applied anisotropy is relatively small, as a result of which the easy axis is oriented in a direction normal to the gap depth, and hence the relation $\mu x > \mu y$ does not hold, as shown in FIG. 1, showing the gap portion of the magnetic head defining a closed magnetic path by a pair of magnetic core halves 121, 122 to an enlarged scale.

On the other hand, if anisotropy applied in a direction parallel to the gap depth direction is larger, there is generated, due to the demagnetizing field produced under the effects of the shape anisotropy, a triangular magnetic domain 123 is generated which minimizes the magnetic energy within the magnetic core film, as shown in FIG. 2. Although the relation $\mu x > \mu y$ holds in such case, the triangular magnetic domain is of such a cyclic structure as to close the magnetic flux within the film plane, and does not lead to improved μx. On the other hand, since the magnetic permeability along the difficult axis is inversely proportional to the magnitude of anisotropy, the value of μx itself becomes small if the anisotropy applied is of too large a magnitude.

Thus, with the laminated magnetic head having narrow gap depth and narrow track width, the playback efficiency cannot be improved sufficiently if anisotropy ia simply afforded so that the gap depth direction is the easy axis, such that it is difficult to improve electromagnetic transducing characteristics in the high frequency region.

OBJECT AND SUMMARY OF THE INVENTION

It is therefore an object of the present invention to provide a magnetic head in which, even if the gap depth and the track width are narrowed, it becomes possible to increase the magnetic permeability μx in a direction normal to the gap depth to render it possible to produce optimum electromagnetic transducing characteristics in the high frequency region.

According to the present invention, there is provided a magnetic head comprising a pair of magnetic core halves each having a magnetic core film sandwiched between a pair of non-magnetic substrates, and being abutted to each other with the end faces of the magnetic core films facing each other, with a magnetic gap being defined in an interface of abutment of said magnetic core films. The magnetic core film is of a laminated magnetic film structure comprising a plurality of laminated magnetic film units laminated with insulating films in-between, each laminated magnetic film unit in turn comprising a plurality of magnetic films with non-magnetic films in-between, with the magnetic films being magnetostatically connected to one another at film ends.

The magnetic film is formed of an alloy represented by a structural formula $(Fe_a Ru_b Ga_c Si_d)_x N_y O_z C_w$, where a, b, c, d, x, y, z and w represent the proportions of respective elements in atomic percent, and having the composition such that $68 \leq a \leq 90$, $0.1 \leq b \leq 10$, $0.1 \leq c \leq 15$, $10 \leq d \leq 25$, $80 \leq x \leq 100$, $0 \leq y \leq 20$, $0 \leq z \leq 20$, $0 \leq w \leq 20$, with $a+b+c+d=100$ and $x+y+z+w=100$.

The magnetic film is set to a film thickness of 0.1 to 1.0 μm, while the non-magnetic film has a film thickness of 0.1 to 20 μm.

The magnetic film is formed of an amorphous magnetic material and the magnetostatic coupling of the magnetic films is maintained even at a temperature exceeding 400° C.

The amorphous magnetic film is formed of an amorphous material mainly formed of Co and containing at least one element selected from the group consisting of Zr, Mo, Pd, Ta, Nb, Ti and Hf.

The non-magnetic film is formed e.g. of Pt.

The magnetic head of the present invention comprises a pair of magnetic core halves each having a magnetic core film sandwiched between a pair of non-magnetic substrates. The magnetic core halves are abutted to each other with the end faces of the magnetic core films facing each other, with a magnetic gap being defined in an interface of abutment of the magnetic core films. The magnetic core film is of a laminated magnetic film structure comprising a plurality of laminated magnetic film units laminated with insulating films in-between, each laminated magnetic film unit in turn comprising a plurality of magnetic films with non-magnetic films in-between, with the magnetic films being magnetostatically connected to one another at film ends.

If such laminated magnetic film unit is employed for the magnetic core film, the magnetic permeability μx in a direction normal to the gap depth is markedly improved, when anisotropy is applied in the gap depth direction, for the following reason.

That is, with the laminated magnetic film unit having plural magnetic films laminated with non-magnetic films in-between, with the magnetic films being magnetostatically coupled with one another at the film ends, if anisotropy is applied to the film unit in a given direction, the direction of magnetization of mutually neighboring magnetic films becomes anti-parallel. Since the magnetic energy is decreased in this manner there is no risk that the magnetostatic energy is increased when anisotropy is applied to single-layer magnetic films, such that triangular magnetic domains are generated for minimizing the magnetostatic energy. Thus there is no risk of the triangular magnetic domains being generated to produce cyclic magnetic flux within the film surface and high magnetic permeability is produced in a direction normal to the afforded anisotropy in order to reflect such applied anisotropy.

Consequently, with the magnetic head employing the laminated magnetic film units, the magnetic permeability μx may be efficiently improved by affording anisotropy in the gap depth direction, with the result that the relation μx>μy is satisfied. On the other hand, with the above magnetic head, plural magnetic film units are laminated with the interposition of the insulating films for suppressing eddy current losses in the high frequency region. As a result, highly satisfactory electro-magnetic transducing characteristics may be displayed in the high frequency region.

Meanwhile, if the magnetic film of a pre-set composition of $(Fe_aRu_bGa_cSi_d)_xN_yO_zC_w$, or an amorphous magnetic film formed mainly of Co is employed in the above-described magnetic head, deterioration in magnetic properties produced during the heat-treatment process such as glass fusion may be minimized since these ally films exhibit satisfactory soft magnetic properties and excellent heat resistance and abrasion resistance. On the other hand, the phenomenon known as partial abrasion, in which the magnetic core film is worn out more severely than the non-magnetic substrate, may be suppressed, with the result that electro-magnetic transducing characteristics are improved further.

In addition, if the Pt film, which is hardly diffused into the magnetic film during heat treatment such as glass fusion, is employed as a non-magnetic film, there is little risk that the non-magnetic film be diffused during this process into the magnetic film to destruct the magnetostatic coupling. Consequently, use of the Pt film as the non-magnetic film is highly meritorious if glass fusion is employed as the bonding method.

BRIEF DESCRIPTION OF THE DRAWINGS

FIGS. 5a, 5b, 5c and 5d are perspective views respectively illustrating a magnetic domain structure in which an easy axis afforded with large anisotropy along the film width is affected by shape anisotropy, a magnetic domain structure in which an easy axis afforded with small anisotropy along the film width is affected by shape anisotropy, and a magnetic domain structure in which magnetic films are laminated with an intermediate film in-between.

FIGS. 6 to 10 are perspective views showing the process of fabricating a magnetic head, step by step, in which FIG. 6 shows the step of forming a magnetic core film on a non-magnetic substrate.

FIG. 7 shows the step of bonding a non-magnetic substrate on which the magnetic core film is formed.

FIG. 8 shows the step of slicing the bonded substrate block to form a magnetic core half block.

FIG. 9 shows the step of forming a winding window in the magnetic core half block.

FIG. 10 shows the step of slicing the magnetic core block.

DETAILED DESCRIPTION OF THE INVENTION

Figure 1:
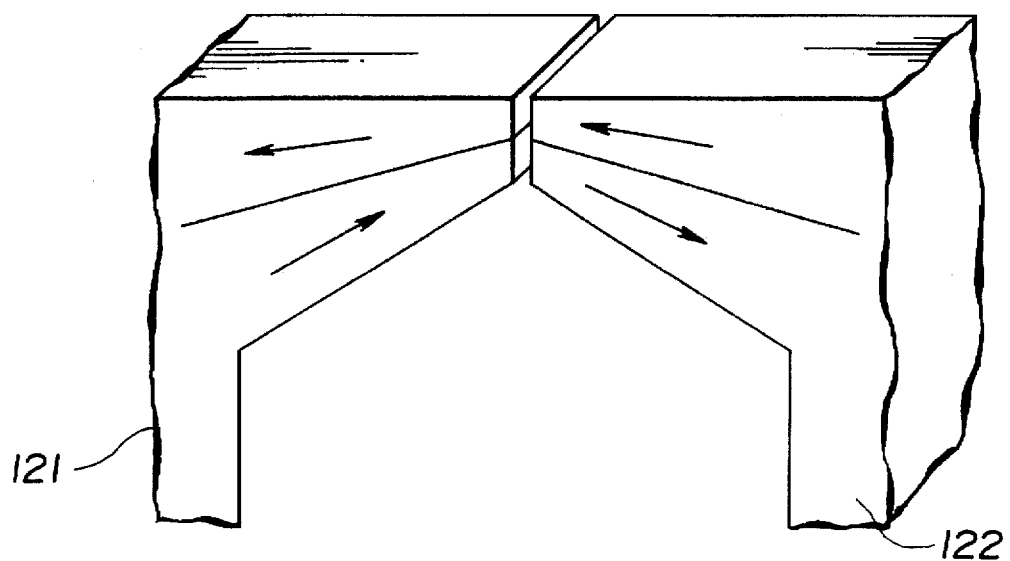
FIG. 1 is a perspective view showing a magnetic domain structure when small anisotropy is applied to a magnetic gap of a conventional magnetic head.
Figure 2:
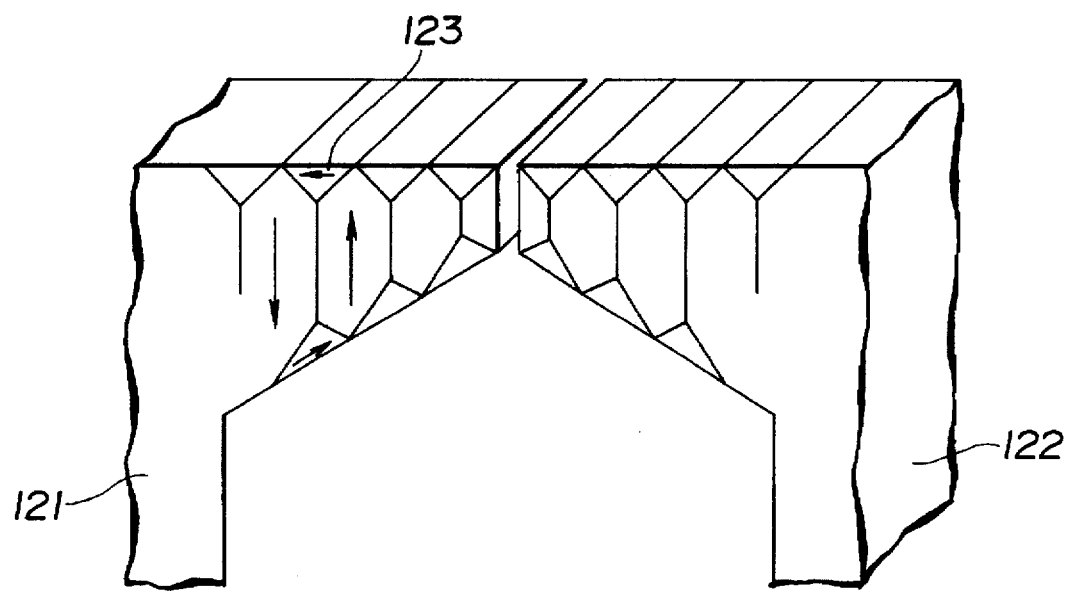
FIG. 2 is a perspective view showing a magnetic domain structure when larger anisotropy is applied to a magnetic gap of a conventional magnetic head.

Referring to the drawings, preferred embodiments of the present invention will be explained win detail.

Figure 3:
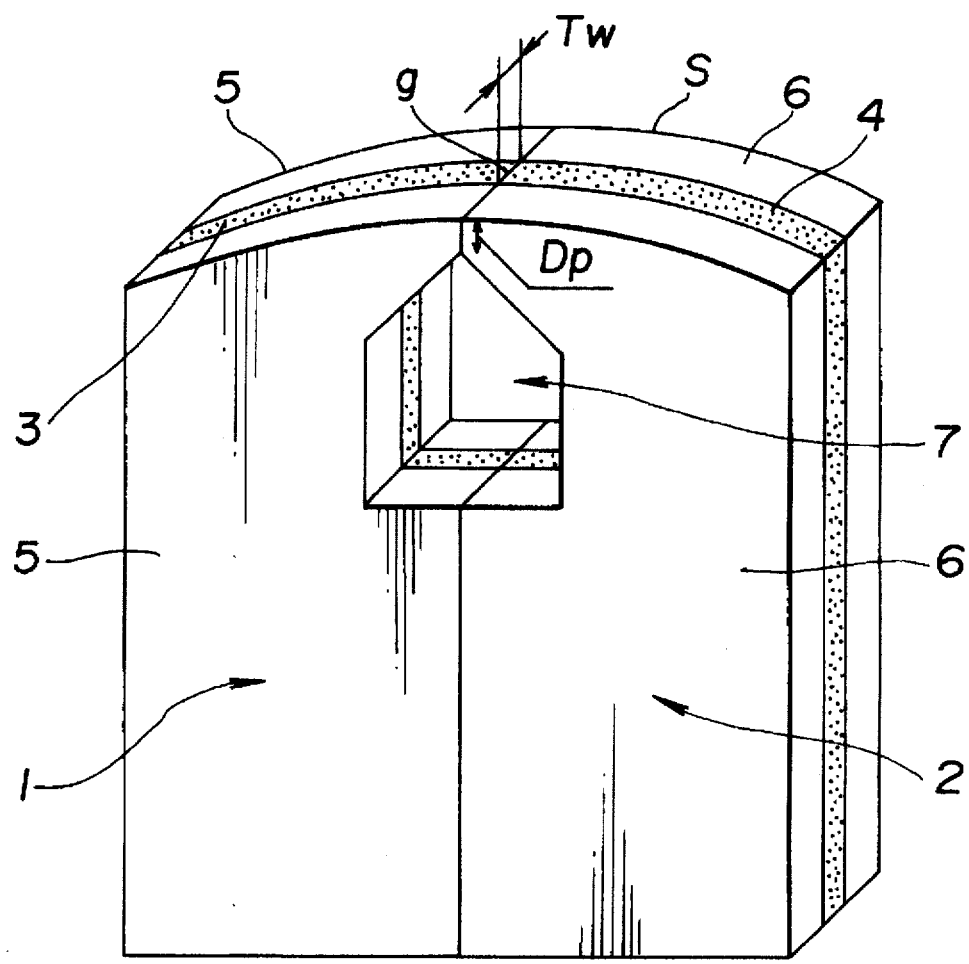
FIG. 3 is a schematic perspective view showing a magnetic head according to the present invention.

The magnetic head according to the present invention is a so-called laminated head as shown in FIG. 3.

The magnetic head of the present embodiment comprises a pair of magnetic core halves 1, 2 abutted to each other for defining a closed magnetic path, with a magnetic gap g defined between abutting surfaces thereof for operating as magnetic gap.

The magnetic core halves 1, 2 are made up respectively of magnetic core films 3, 4 and non-magnetic substrates 5, 6 of a non-magnetic material placed on both sides of the magnetic core halves 3, 4, as shown in FIG. 3. The magnetic gap g is defined by end faces of the magnetic core films 3, 4 exposed on the abutting surfaces of the magnetic core halves 1, 2. The track width Tw of the magnetic gap g is determined by the film thickness of each of the magnetic core films 3, 4 because the substrates 5, 8 are of a non-magnetic material.

A winding window 7 is formed in the abutting surfaces of the magnetic core halves 1, 2 for defining the depth Dp of the magnetic gap g and for winding a coil, herein not shown. The winding window 7 is formed through the core thickness as a substantially rectangular through-hole at a mid portion of the magnetic core halves 1, 2.

Figure 4:
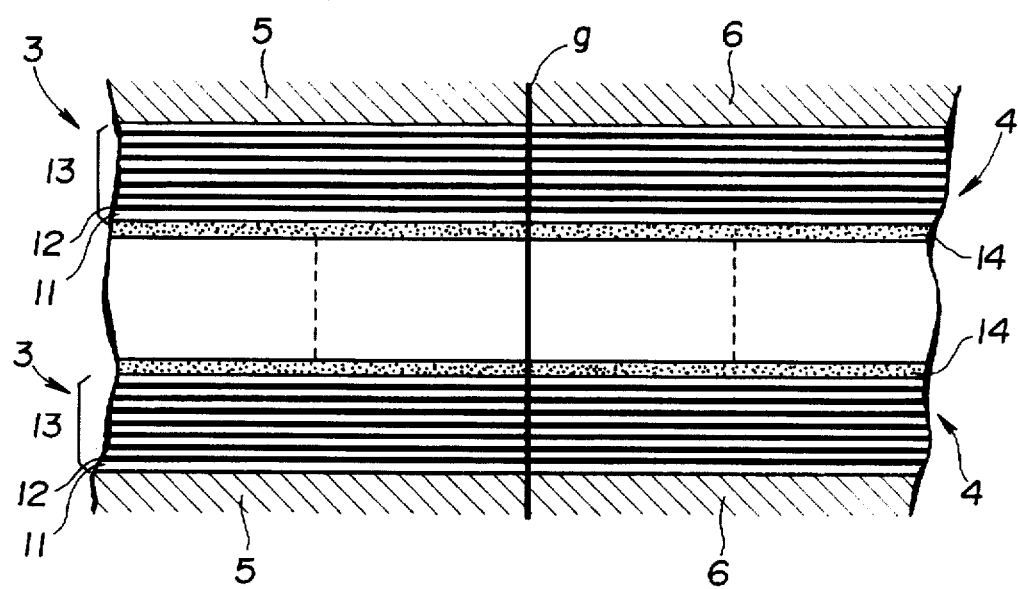
FIG. 4 is a cross-sectional view showing the vicinity of the magnetic gap of the magnetic head.

With the magnetic head of the present embodiment, each of the magnetic core films 3, 4 comprises plural laminated magnetic film units 13, laminated with non-magnetic films 14 of smaller film thicknesses in-between, each magnetic film unit 13 in turn comprising plural layers of magnetic films 11 of smaller film thicknesses, laminated one on others with non-magnetic films 12 in-between, with the magnetic films 11 being magnetostatically coupled to one another at end portions thereof, as shown in FIG. 4. Meanwhile, FIG. 4 shows the magnetic gap of the magnetic head, as viewed from a magnetic head surface S on which the magnetic recording medium is slid.

The reason the magnetic film unit 13 comprising plural layers of magnetic films 11 of smaller film thicknesses, laminated on one others with the non-magnetic films 12 in-between, with the magnetic films 11 being magnetostatically coupled to one another at end portions thereof, is that, even when the track width Tw and the gap depth Dp are narrowed, magnetic permeability μx in a direction normal to the gap depth may be increased by applying anisotropy along the gap depth direction for maintaining superior electro-magnetic transducing characteristics in the high frequency range.

That is, with such laminated magnetic head, since the magnetic core film has an easy axis along the gap depth direction, the magnetic permeability μx in a direction normal to the gap depth is increased for improving electro-magnetic transducing characteristics.

Figure 5A:
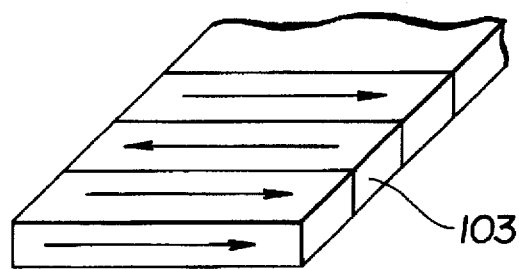

FIG. 5a schematically illustrates the magnetic domain structure in such a case in which anisotropy is applied along the gap depth of the single-layer magnetic film 103 and the demagnetizing field in such direction is not taken into account. In FIG. 5a, the short-axis direction represents the gap depth direction and arrows indicate the direction of magnetization.

Figure 5B:
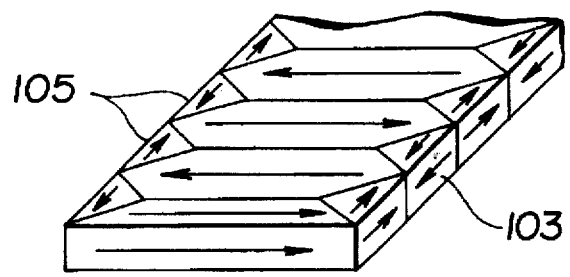

However, the magnetic core film having narrow track width Tw and narrow gap depth Dp exhibits shape anisotropy which renders the gap depth direction into the direction of hard magnetization, such that, if anisotropy is afforded in the gap depth direction, an extremely large demagnetizing field is produced. Consequently, an ideal magnetic domain structure such as shown in FIG. 5a cannot be achieved, such that, if the anisotropy applied is of a larger magnitude, a triangular magnetic domain 105 is generated for minimizing the magnetic energy, as shown in FIG. 5b, thus inducing the cyclic magnetic flux within the film plane. As a result, it is not possible to elevate the effective magnetic permeability μx.

Figure 5C:
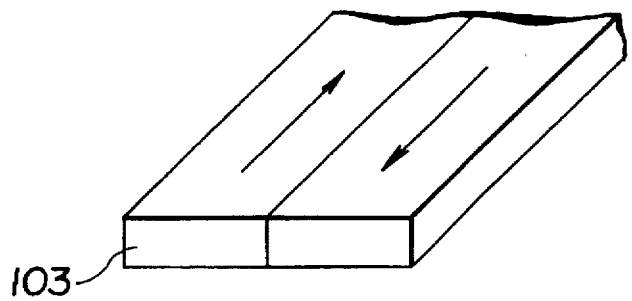

If the anisotropy afforded along the gap depth direction is smaller, the magnetic domain structure is affected by shape anisotropy, such that the easy axis is oriented an a direction normal to the gap depth as shown in FIG. 5c, hence magnetic permeability μx cannot be improved.

Figure 5D:
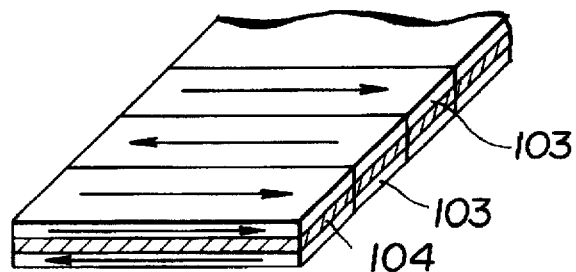
Figure 6:
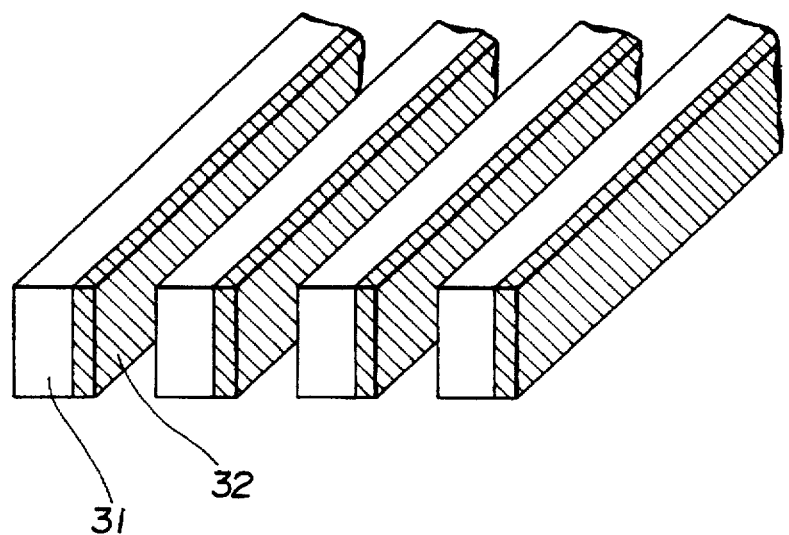

If the magnetic core film comprises plural magnetic films 103 laminated with non-magnetic films 104 in-between, as shown in FIG. 5d, the upper-layer and lower-layer magnetic films 103, 103 are magnetostatically coupled with each other at the film ends, and are magnetized in anti-parallel direction, as a result of which the magnetic energy is decreased and the triangular magnetic domain disappears for realizing an ideal magnetic domain structure.

Consequently, with the magnetic head of the present embodiment having such laminated magnetic films as the magnetic core films 3, 4, if anisotropy is applied along the gap depth, the magnetic permeability μx is improved for reflecting the applied anisotropy to satisfy the relation μx>μy, thus improving the electro-magnetic transducing characteristics in the high frequency region significantly, even although the track width Tw and the gap depth are on the order of tens of μm.

As for the magnetic films 11 making up the laminated magnetic film unit 13, it is only sufficient if the films 11 are formed of a magnetic alloy material having superior soft magnetic characteristics, employed as magnetic core films in an ordinary laminated magnetic head, no matter whether the material is crystalline or amorphous.

The crystalline magnetic materials may be enumerated by Fe-Al-Si alloys, Fe-Si-Co alloys, Fe-Ni alloys, Fe-Al-Ge alloys, Fe-Ga-Ge alloys, Fe-Si-Ge alloys, Fe-Si-Ga alloys, Fe-Si-Ga-Ru alloys and Fe-Co-Si-Al alloys. One or more of the elements Ti, Cr, Mn, Zr, Nb, Mo, Ta, W, Ru, Os, Rh, Ir, Re, Ni, Pd, Pt, Hf and V may also be added to the above alloys for further improving corrosion resistance or abrasion resistance.

Above all, a magnetic film, having its crystal grains comminuted by containing N, O or C in the Fe-Ru-Ga-Si alloys, that is the magnetic film having a structural formula $(Fe_aRu_bGa_cSi_d)_xN_yO_zC_w$, where a, b, c, d, x, y, z and w represent the proportions of respective elements in atomic percent, and having the composition such that $68 \leq a \leq 90$, $0.1 \leq b \leq 10$, $0.1 \leq c \leq 15$, $10 \leq d \leq 25$, $80 \leq x \leq 100$, $0 \leq y \leq 20$, $0 \leq z \leq 20$, $0 \leq w \leq 20$, with $a+b+c+d=100$ and $x+y+z+w=100$, is suitable as a core material in magnetic permeability and coercivity and has a high saturation magnetic flux density. Besides, such magnetic film is superior in corrosion resistance, abrasion resistance and thermal stability and hence is able to maintain good magnetic properties even after the connection process following glass fusion. In addition, the phenomenon termed partial abrasion, in which the magnetic core film undergoes abrasion more significantly than the non-magnetic substrate due to sliding of the magnetic medium on the gap surface, is also suppressed for realizing further improvement in electro-magnetic transducing characteristics.

The range of the proportions (a, b, c and d) for Fe, Ru, Ga and Si is set in view of magnetic characteristics, such that higher values of the magnetic flux density or magnetic permeability cannot be maintained outside this range. Meanwhile, up to 15 atomic percent of Fe in the above composition may be replaced by Co or Ni. In addition, up to 6 atomic percent of the sum total of Ga and Si may be replaced by one or more of Ti, Cr, Mn, Zr, Nb, Mo, Ta, Rh, W, Os, Ir, Re, Ni, Pd, Pt, Hf, Y, B and In.

The proportions for nitrogen, oxygen and carbon (y, z, w) are set in view of soft magnetic characteristics. If these proportions become excessive, such as larger than 20 atomic percent, it becomes difficult to maintain low coercivity and high magnetic permeability.

The magnetic film 11 may be formed not only of the above crystalline magnetic materials, but also of magnetic amorphous metal alloys, or so-called amorphous alloys. The amorphous alloys are devoid of crystalline magnetic anisotropy such that it is easier to obtain high magnetic permeability than with crystalline magnetic materials. The amorphous alloys may be enumerated by alloys composed of one or more of elements Fe, Ni and Co and one or more of elements P, C, B and Si, metal-metalloid amorphous alloys, such as alloys mainly composed of Fe, Ni and Co and also containing Al, Ge, Be, Sn, In, Mo, W, Ti, Mn, Cr, Zr, Hf, Nb, Pd or Ta, and metal-metal amorphous alloys mainly composed of transition metals such as Co, Ni or Fe and Zr, Hf, Mo, Nb, Ti, or Ta.

Above all, an amorphous alloy having the compositional formula $Co_aZr_bNb_cTa_d$, where a, b, c and d represent proportions of respective elements, and the range of the proportions is $68 \leq a \leq 90$, $0 \leq b \leq 10$, $0 \leq c \leq 20$ and $0 \leq d \leq 10$, with. a+b+c+d=100, is superior in soft magnetic characteristics.

Of the CoZrNbTa amorphous alloys having such composition, such amorphous alloy having the range of the proportions of $79 \leq a \leq 83$, $2 \leq b \leq 6$, $10 \leq c \leq 14$ and $1 \leq d \leq 5$, with a+b+c+d=100, is superior in thermal resistance and abrasion resistance and able to maintain soft magnetic characteristics even after heat treatment at 400° to 600° C. during the glass fusion process. On the other hand, it becomes possible to suppress partial abrasion in which the magnetic core films undergo abrasion more significantly than the non-magnetic substrates, such that a magnetic head may be realized which can stand high-speed sliding contact with the recording medium accompanying the coming into use of high definition television or video tape recorders (VTRs).

The non-magnetic film 12 interposed between the magnetic films 11 formed of the above materials may be enumerated by non-magnetic metals, such as Pt, Au or Cu, oxide films, such as $SiO_2$, $ZrO_2$ or $Ta_2O_5$ or nitride films such as $Si_3N_4$, TaN or TiN, in addition to Cr. Of these, the Pt film is highly useful when glass fusion is employed as the bonding method, because Pt is not diffused into the magnetic film even at a temperature of not lower than 400° C. and hence there is little possibility of the non-magnetic film being diffused during the glass bonding process into the magnetic film to destroy the magnetostatic coupling.

The magnetic film 11 and the non-magnetic film 12 are formed by vacuum thin film forming techniques, such as the in-gas evaporation method, cluster ion beam method or the sputtering method. Above all, the sputtering method is most preferred in view of intimate film bonding characteristics.

The sputtering method may be enumerated by a two-terminal parallel plate sputtering, facing target sputtering, direct current sputtering, high frequency sputtering, either singly or in combination with the bias system.

When the sputtering method is employed, the magnetic film 11 and the non-magnetic film 12 are formed alternately continuously under respective conditions within separate sputtering devices or within the same sputtering device, using an argon gas, for example, as a sputtering gas. For forming these films, the degree of vacuum within the sputtering device prior to argon gas introduction is preferably set to a high vacuum of not lower than $10^{-4}$ Pa for preventing residual oxygen, nitrogen or impurities from affecting the properties of the laminated magnetic film unit.

For realizing a laminated magnetic film unit 13, comprising the magnetic film 11 and the non-magnetic film 12 formed of the above materials, in which the ends of the magnetic films 11 are magnetostatically coupled to one another, it is crucial to set the thicknesses of the magnetic film 11 and the non-magnetic film If the magnetic film 11 is too thick, the film end surface is increased in area, such that magnetostatic coupling at the film ends is lowered in strength. If the magnetic film 11 is too thin, the thickness of the magnetic films accounts for a smaller fraction of the total film thickness of the magnetic core film, such that effective magnetic characteristics of the magnetic core films 3, 4 are deteriorated. In this consideration, the thickness of the magnetic film is set preferably to 0.1 to 1.0 μm and more preferably to 0.1 to 0.5μm.

On the other hand, if the non-magnetic film 12 is too thick, the magnetic films 11 arranged on the upper and lower sides of the non-magnetic film 12 are spaced apart to a larger extent from each other, thereby weakening the magnetostatic coupling. Conversely, if the non-magnetic film 12 is too thin, the laminated magnetic film unit 13 approaches the single-layer structure so that the merit of the laminated structure is lost. Consequently, the thickness of the non-magnetic film 12 is preferably 1 to 20 nm.

The magnetic core films 3, 4 are of a laminated structure in which plural laminated magnetic film units 13, made up of the magnetic films 11 and the non-magnetic film 12, are laminated with the insulating films 14 of larger film thicknesses in-between. This diminishes eddy current losses in the high frequency region for further improving electromagnetic transducing characteristics.

Referring to the drawings, the method for fabricating the magnetic head shown in FIG. 3 is now explained step-by-step.

Figure 8:
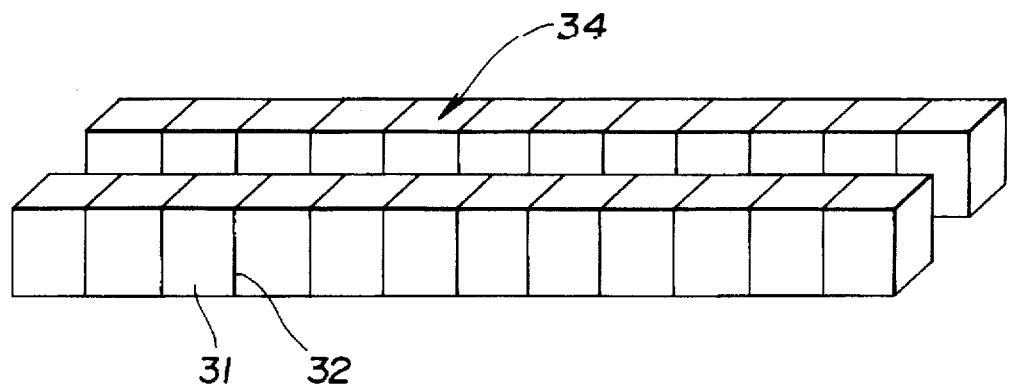

For fabricating the above magnetic head, a plurality of rectangular-shaped non-magnetic substrates 31 as shown in FIG. 8 are prepared and both major surfaces thereof are ground to a mirror finish.

On one of the major surfaces of the non-magnetic substrate 31, ground to a mirror finish, magnetic films and non-magnetic films are repeatedly formed by any vacuum thin film forming method, such as sputtering, for forming a magnetic film unit. After forming an insulating film thereon, another magnetic film unit is formed. This sequence of operations is repeated until completion of a magnetic core film 32.

Figure 7:
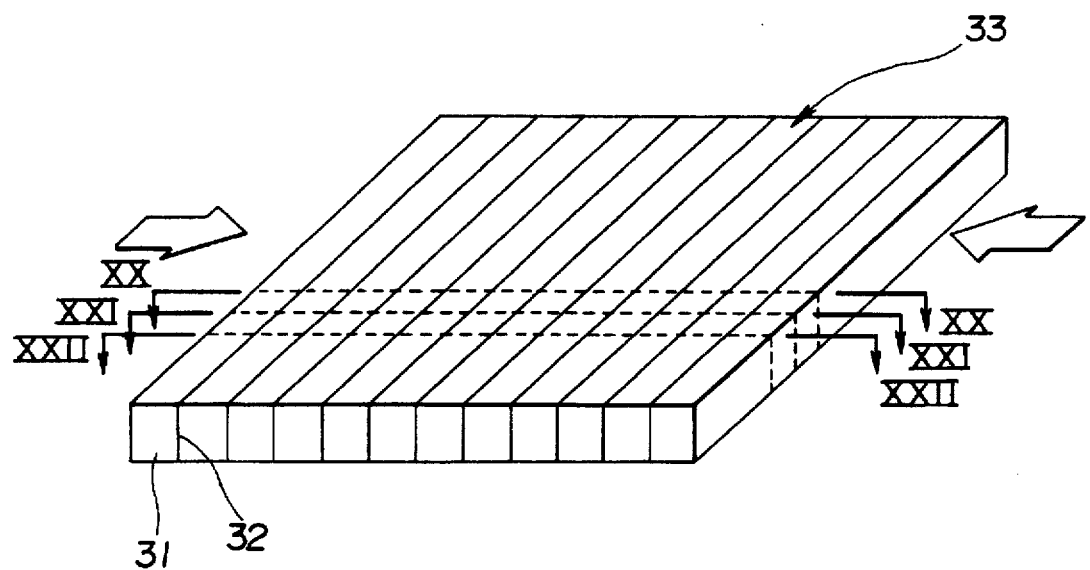

These non-magnetic substrates 31, on which the magnetic core films 32 have been formed as described above, are stacked together so that the non-magnetic substrates 31 and the magnetic core films 32 are alternated with one another, as shown in FIG. 7, for fabricating a substrate block 33.

The substrate block 33 is sliced in a direction substantially normal to the magnetic core films 32, as indicated by lines A—A, B—B and C—C, for fabricating a magnetic core half block 34 shown in FIG. 8.

A winding slot 38 for winding a coil is then formed on a surface of the magnetic core half block 34 which is to be a surface having a magnetic gap g, that is an abutting surface, on the entire surface of the magnetic core half block 34.

Figure 9:
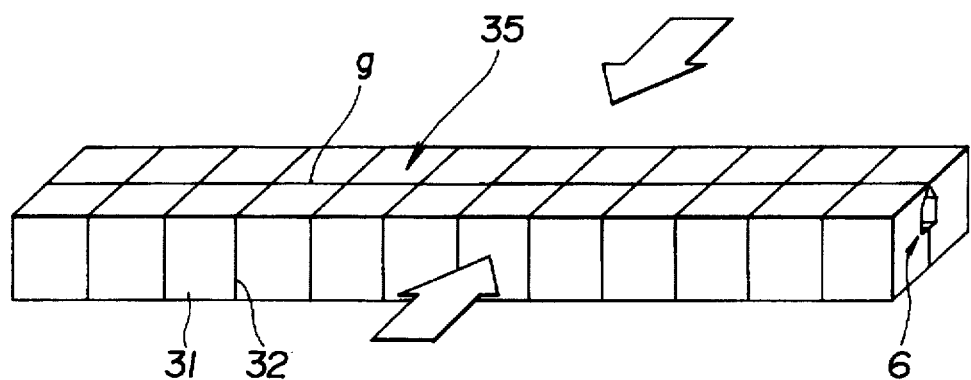

After grinding the abutting surface of the magnetic core half block, now having the winding slot, is abutted and bonded to another magnetic core half block 34, fabricated in a similar manner, as shown in FIG. 9. During such abutment, the end faces of the magnetic core films 32 of the two magnetic core half blocks 34 are brought into correct registration with each other. The result is that the magnetic gap g is now defined between the magnetic core films abutted to each other.

Figure 10:
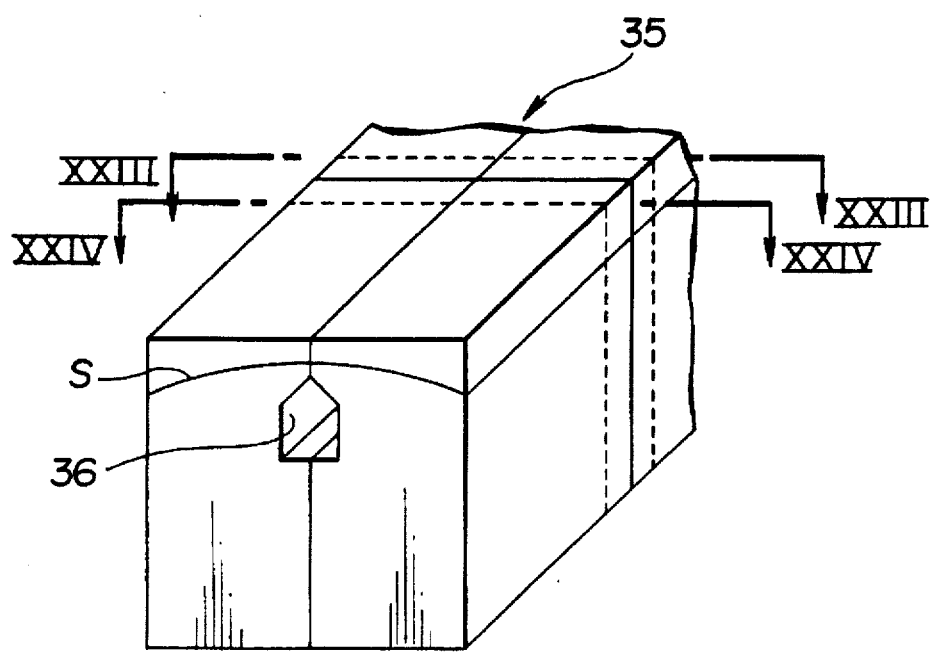

The magnetic core block 35 thus formed is ground to a cylindrical surface for assuring abutment against the magnetic recording medium for forming a sliding surface S for the magnetic recording medium, and is sliced at positions indicated by lines D—D and E—E, as shown in FIG. 10. This completes a magnetic head the magnetic core film of which is formed by laminated magnetic film units comprising plural laminated magnetic film units, each having plural magnetic films magneto-statically coupled at the film ends, with such magnetic film units being stacked together with insulating films in-between, as shown in FIG. 3.

During the above-described production process, the respective components may be bonded by well-known bonding methods. Example of these bonding methods include a low-temperature heat diffusion bonding method of bonding the components by heat diffusion of the metal layers and a glass bonding method of placing a fused glass in the bonding surfaces and bonding the components by the heat fusion of the bonding glass.

Investigations into Magnetic Film Employed in Magnetic Core Film

Five samples of the magnetic heads of the above structure (sample heads 1 to 5) were fabricated, changing the composition of the magnetic core films, and playback outputs were checked.

The sample head 1 has a CoZrPdMo amorphous film having a film thickness of 388 nm, as a magnetic film, a Cr film having a film thickness of 10 nm, as a non-magnetic film, and an $SiO_2$ film having a film thickness of 200 nm, as an insulating film. The magnetic film unit 13 is fabricated by laminating plural magnetic films 11 with the non-magnetic films 12 interposed in-between, with the total film thickness being 3 μm. The magnetic core film is fabricated by laminating plural magnetic film units 13 with the insulating films 14 in-between, and is of a total film thickness of 15.8 μm.

The sample head 2 is similar in structure to the sample head 1, except that the non-magnetic film is an $SiO_2$ film having a film thickness of 10 nm.

With the sample head 3, the magnetic film is an FeRuGaSi alloy film, having a film thickness of 388 nm, the non-magnetic film is an $SiO_2$ film having a film thickness of 10 nm and the insulating film is an $SiO_2$ film having a film thickness of 200 nm. The magnetic film unit 13 is fabricated by laminating the magnetic films 11 with the non-magnetic films 12 in-between, and has a total film thickness of 3 μm. The magnetic core film is fabricated by laminating plural magnetic film units 13 with the insulating films 14 in-between, and is of a total film thickness of 15.8 μm.

The sample head 4 is similar in structure to the magnetic head 3, except that the non-magnetic film is a Pt film having a film thickness of 10 nm.

With the sample head 5, the magnetic film is a CoZrNbTa amorphous film, having a film thickness of 241 nm, the non-magnetic film is an $SiO_2$ film having a film thickness of 10 nm and the insulating film is an $SiO_2$ film having a film thickness of 200 nm. The magnetic film unit 13 is fabricated by laminating the magnetic films 11 with the non-magnetic films 12 in-between, and has a total film thickness of 2 μm. The magnetic core film is fabricated by laminating plural magnetic film units 13 with the insulating films 14 in-between, and is of a total film thickness of 19.6 μm.

The respective films making up the magnetic core film were formed by a sputtering method under the following film-forming conditions:

The CoZrPdMo amorphous film was formed by a DC magnetron sputtering system under introducing an argon gas at a pressure of 0.4 Pa at a power density of 5.0 W/cm² and an electrode-to-electrode distance of 60 mm, using $Co_{77}Zr_{11}Mo_8Pd_4$ as a target. (subscripts denote the proportions of the elements in atomic percent, hereinafter the same).

The FeRuGaSi alloy film was formed by a DC magnetron sputtering system under introducing Ar+$O_2$ gas at an $O_2$ partial pressure of 10% at a power density of 5.0 W/cm² and an electrode-to-electrode distance of 60 mm, using $Fe_{76}Ru_4Ga_6Si_{14}$ as a target.

The CoZrNbTa amorphous film was formed by a DC magnetron sputtering system under introducing an argon gas at an argon gas pressure of 0.4 Pa at a power density of 5.0 W/cm² and an electrode-to-electrode distance of 60 mm, using $Co_{81}Zr_4Nb_{12}Ta_3$ as a target.

The Cr film was formed by a high-frequency sputtering system under introducing an argon gas at an argon gas pressure of 0.4 Pa at a power density of 1.0 W/cm² and an electrode-to-electrode distance of 60 mm, using Cr as a target.

The $SiO_2$ film was formed by a high-frequency sputtering system under introducing an argon gas at an argon gas pressure of 0.3 Pa at a power density of 5.0 W/cm² and an electrode-to-electrode distance of 60 mm, using $SiO_2$ as a target.

On the other hand, anisotropy of Ku=100 J/m³ was afforded to the magnetic core film of each head in a direction parallel to the gap depth.

Using a metal tape, with coercivity of 1450 Oe, running at relative velocity of 20 m/second, the playback output of each sample head was measured. Table 1 shows the results of comparison with control heads for respective sample heads, namely magnetic heads of the same shape as the sample heads and not having non-magnetic films (magnetic beads in which the magnetic core film comprises plural single-layer magnetic films laminated with insulating films in-between) as conventional magnetic heads, with the playback outputs of these conventional control magnetic heads being 0 dB.

TABLE 1

| | Playback Output (dB) | | | | |
|---|---|---|---|---|---|
| Frequency | 5 MHz | 10 MHz | 20 MHz | 30 MHz | 40 MHz |
| Head 1 | 0.8 | 1.5 | 3.0 | 3.4 | 5.5 |
| Head 2 | 0.9 | 1.7 | 3.2 | 3.5 | 5.6 |
| Head 3 | 0.6 | 1.7 | 2.7 | 3.6 | 5.8 |
| Head 4 | 0.7 | 1.6 | 2.8 | 3.2 | 5.5 |
| Head 5 | 2.4 | 3.0 | 5.4 | 6.0 | 9.0 |

It is seen from Table 1 that high playback outputs are obtained with the sample heads 1 to 5 and that the playback output is high in the high frequency region.

Thus it is seen that the laminated magnetic film arrangement comprising plural magnetic film units laminated with insulating films in-between, with each magnetic film unit in turn comprising plural magnetic films laminated with non-insulating films in-between, is effective in improving electro-magnetic transducing characteristics of the magnetic head, especially in the high frequency range.

Investigations into Non-magnetic Film Employed in Magnetic Core Film

With the above-described magnetic head employing the laminated magnetic film units, it may be contemplated that, if glass fusion is used as the bonding method, the non-magnetic film material is diffused into the magnetic film under the processing heat, leading to destruction or breakage of the magnetic film or otherwise deteriorating its magnetic characteristics. In this consideration thermal stability of the non-magnetic film was analyzed.

Figure 11:
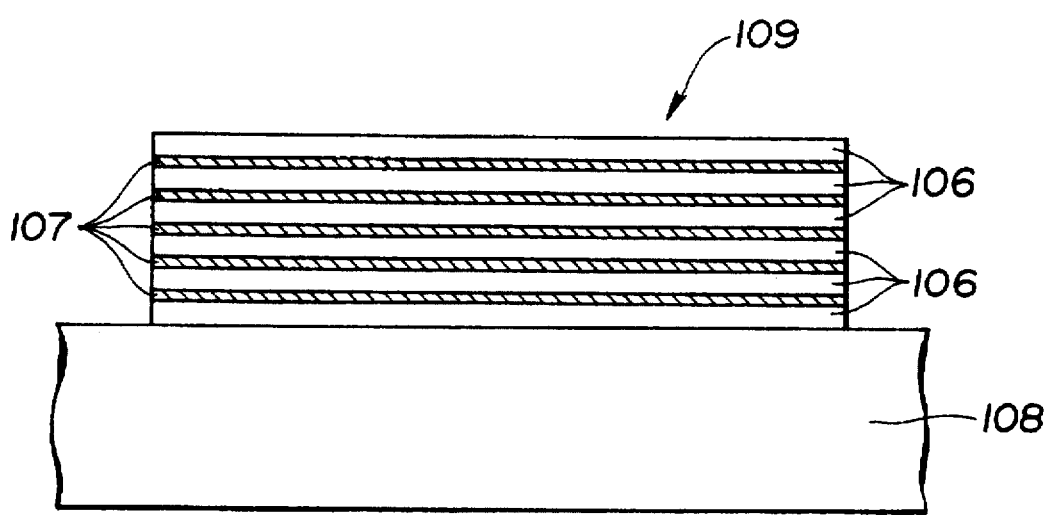
FIG. 11 is an enlarged cross-sectional view showing a laminated magnetic film unit made up of a magnetic film and a non-magnetic film.

First, a model sample shown in FIG. 11 was prepared. Thus, plural layers of CoZrMoPd amorphous magnetic films, equivalent to the magnetic films 106, were laminated with the Cr or Pt films equivalent to the non-magnetic films 107 as intermediate films in-between to form a laminated magnetic film 109 having a total film thickness of about 3 μm on a non-magnetic substrate 108, which was sliced to strips each 30 μm wide to form magnetic core film samples 1 and 2. The magnetic core film sample 1 has the Cr films as the non-magnetic films 107, while the magnetic core film sample 2 has the Pt films as the non-magnetic films 107. Film formation was performed using a DC two-electrode sputtering device under the following sputtering conditions:

A CoZrMoPd amorphous magnetic film was formed under introducing an argon gas at an argon gas pressure of 0.4 Pa and a power density of 5.0 W/cm² at an electrode-to-electrode distance of 60 mm, using $Co_{77}Zr_{11}Mo_8Pd_4$ as a target.

A non-magnetic film was formed under introducing an argon gas at an argon gas pressure of 0.4 Pa and a power density of 1.0 W/cm² at an electrode-to-electrode distance of 60 mm, using Cr or Pt as a target.

The magnetic core film sample thus fabricated was heat-treated in vacuum at 230° C. for 30 minutes under applying a magnetic field of 320 kA/m along the width of the magnetic core film sample thus prepared. The magnetic permeability of the sample was then measured along the film length using a letter eight coil method.

A control sample, namely a single-layer CoZrMoPd amorphous magnetic film, produced in the same way as above except not forming the intermediate layer, was heat-treated by being maintained in vacuum under applying a magnetic field, and subsequently, its magnetic permeability was measured.

The magnetic permeability of 8-layer laminated magnetic film, with the amorphous magnetic films each having a fixed thickness of 0.37 μm and non-magnetic metal films as intermediate films of non-fixed thicknesses was then measured. The results are shown in Table 2.

TABLE 2

| Intermediate Film | Thickness of Intermediate Film (nm) | Magnetic Permeability (at 5 MHz) |
|---|---|---|
| Cr | 1 | 3000 |
|  | 4 | 4500 |
|  | 9 | 4500 |
|  | 30 | 4000 |
| Pt | 1.5 | 4000 |
|  | 4 | 4400 |
|  | 10 | 4600 |
|  | 28 | 0 |
| Single-Layer Film | 0 | 300 |

It is seen from Table 2 that, as compared to the single-layer structure magnetic film, the laminated magnetic film having the intermediate films exhibits high magnetic permeability, and that there is an optimum film thickness for the intermediate film in connection with improvement in magnetic permeability.

The magnetic permeability of the laminated magnetic film, having fixed thickness of the intermediate films, that is the thickness of 9 nm for the Cr film and 10 nm for the Pt film, and having non-fixed thicknesses and non-fixed numbers of lamination of the amorphous magnetic films, with the total film thickness of the laminated magnetic film being 3 μm, was measured. The results are shown in Table 3. It is seen from table 3 that the larger the number of laminated layers of the amorphous magnetic films, in other words, the thinner the thickness of the amorphous magnetic films, the more outstanding is the effect in improving magnetic permeability.

TABLE 3

| Intermediate Film | Number of Laminated Magnetic Film | Magnetic Permeability (at 5 MHz) |
|---|---|---|
| Cr | 2 | 400 |
|  | 4 | 800 |
|  | 6 | 3000 |
|  | 8 | 4500 |
| Pt | 2 | 500 |
|  | 4 | 1000 |
|  | 6 | 2800 |
|  | 8 | 4300 |

Figure 12:
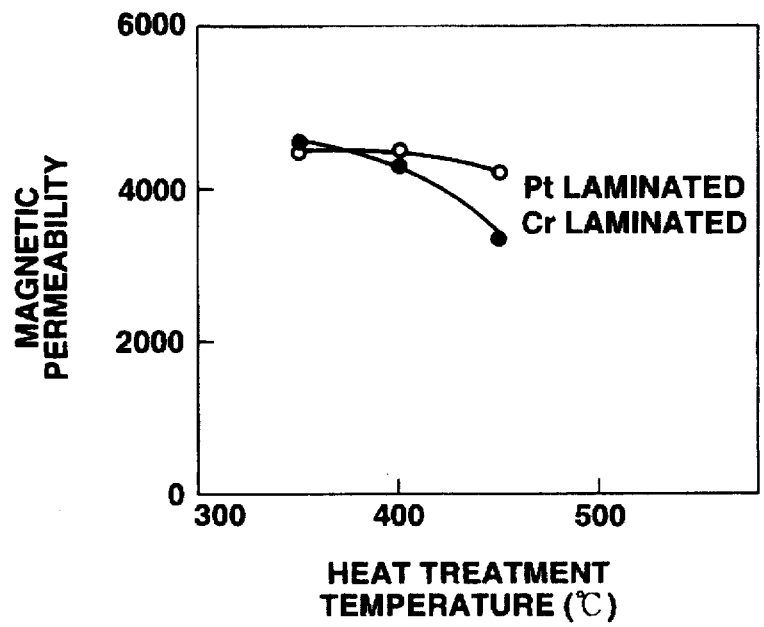
FIG. 12 is a graph showing the relation between magnetic permeability and the heat-treatment temperature of the laminated magnetic film unit.

FIG. 12 shows the magnetic permeability for variable heat-treatment temperatures with two different types of the laminated magnetic films each being of an 8-layer structure comprising amorphous magnetic films 0.37 μm thick with Cr and Pt layers of up to 10 nm interposed in-between. It is seen from FIG. 12 that high magnetic permeability is maintained with the Pt laminated film even if subjected to heat treatment at 440° C.

Investigations into Insulating Film of Magnetic Core Film

The effect of interposition of the insulating film between the laminated magnetic film units was analyzed.

Figure 13:
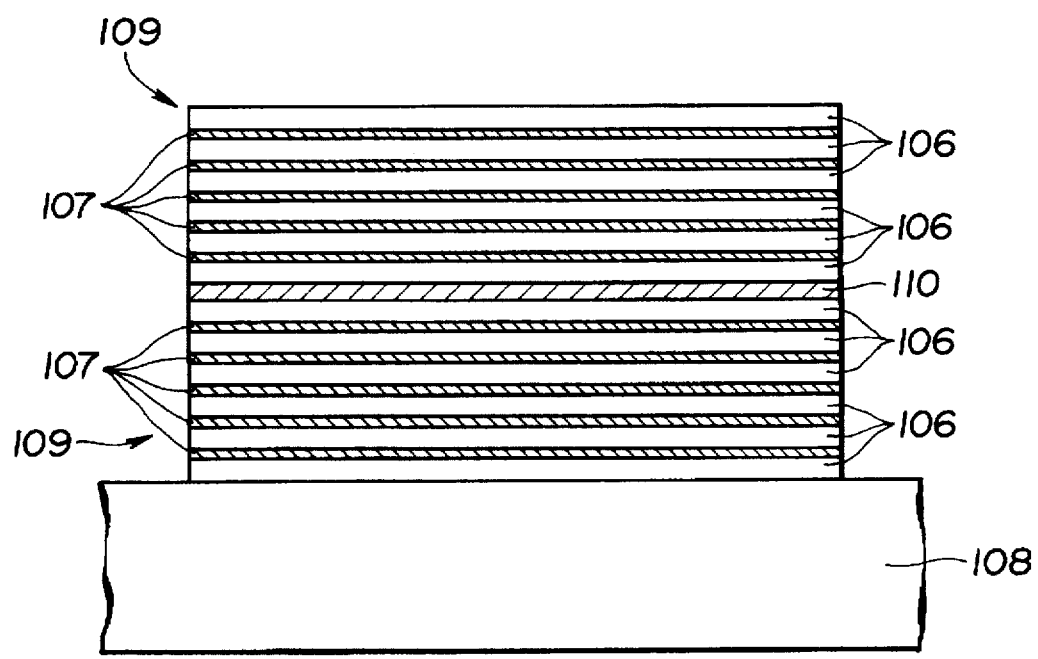
FIG. 13 is an enlarged cross-sectional view showing the laminated magnetic film unit made up of a magnetic film and an insulating layer.

An eight-layer laminated magnetic film unit, having a total film thickness of approximately 3 μm, was formed on a non-magnetic substrate 108 by laminating eight layers of magnetic films 106 with seven layers of non-magnetic films 107 in-between, as shown in FIG. 13. On this laminated magnetic film unit 109 was deposited an $SiO_2$ film of a film thickness of 0.2 μm, corresponding to the insulating film 110. On this $SiO_2$ film was further deposited the laminated magnetic film unit 109 of a similar structure, an $SiO_2$ film of a film thickness of 0.2 μm and a laminated magnetic film unit of a thickness of 3 μm to produce a magnetic core film sample 3 of a three-layer structure having a thickness of 9.4 μm. The magnetic film 106 and the non-magnetic film 107 were formed under the film-forming conditions similar to those for the magnetic core film sample described above. The $SiO_2$ film was formed by a high-frequency sputtering system at a power density of 5.0 W/cm² and an argon gas pressure of 0.5 Pa at an electrode-to-electrode distance of 60 mm.

Figure 14:
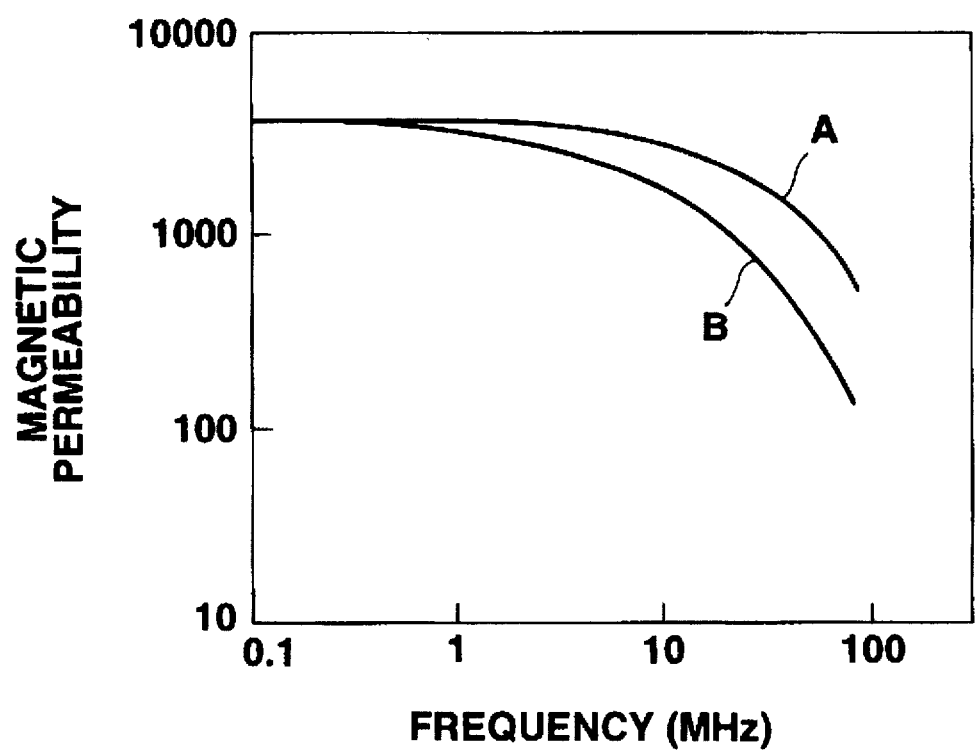
FIG. 14 is a graph showing the relation between magnetic permeability and the frequency of the laminated magnetic film.

FIG. 14 shows the frequency characteristics of the magnetic permeability, wherein A and B stand for characteristics of the three-layer structure magnetic core film sample and a 24-layer laminated magnetic film, with a thickness of 9 μm, having no non-magnetic insulating films interposed in-between. It is seen from FIG. 14 that high-frequency characteristics have been improved by the insertion of the non-magnetic insulating films.

What is claimed is:

1. A magnetic head comprising a pair of magnetic core halves each, having a magnetic core film sandwiched between a pair of non-magnetic substrates, said magnetic core halves being abutted to each other with faces of the magnetic core films facing each other with a magnetic gap being defined in an interface of abutment of said magnetic core films, wherein the improvement resides in that:

said magnetic core film is of a laminated magnetic film structure comprising a plurality of laminated film units laminated with insulating films in-between, each laminated magnetic film unit in mm comprising a plurality of magnetic films with non-magnetic films in-between, the magnetic films being magnetostatically connected to one another at film ends, said magnetic films being of a thickness to provide magnetostatic coupling of said magnetic films, and said non-magnetic films being of a thickness to allow the magnetic films juxtaposed with opposite sides with said non-magnetic film to assume anti-parallel magnetizations, each of the magnetic films having a film thickness of 0.1 to 1.0 μm, each of the non-magnetic films having a film thickness of 0.1 to 20 nm, and each of the insulating films being thicker than each of the magnetic films and the non-magnetic films, the magnetic films being selected from the group consisting of (1) materials having a structural formula $(Fe_aRu_bGa_cSi_d)_xN_yO_zC_w$, where a, b, c, d, x, y, z and w represent the proportions of respective elements in atomic percent, and having the composition such that $68 \leq a \leq 90$, $0.1 \leq b \leq 10$, $0.1 \leq c \leq 15$, $10 \leq d \leq 25$, $80 \leq x \leq 100$, $0 \leq y \leq 20$, $0 \leq z \leq 20$, $0 \leq w \leq 20$, with $a+b+c+d=100$ and $x+y+z+w=100$. (2) Fe-Al-Si alloys. (3) Fe-Si-Co alloys, (4) Fe-Ni alloys, (5) Fe-Al-Ge alloys, (6) Fe-Ga-Ge alloys, (7) Fe-Si-Ge alloys, (8) Fe-Si-Ga alloys, (9) Fe-Si-Ga-Ru alloys, (10) Fe-Co-Si-Al alloys and (11) amorphous magnetic materials mainly formed of cobalt CO and containing at least one element selected from the group consisting of Zr, Mo, Pd, Ta, Nb, Ti and Hf, the non-magnetic films being selected from the group consisting of Pt, Au, Cu, Cr, oxide films and nitride films.

2. The magnetic head as claimed in claim 1 wherein said magnetic film is represented by a structural formula $(Fe_aRu_bGa_cSi_d)_xN_yO_zC_w$, where a, b, c, d, x, y, z and w represent the proportions of respective elements in atomic percent, and having the composition such that $68 \leq a \leq 90$, $0.1 \leq b \leq 10$, $0.1 \leq c \leq 15$, $10 \leq d \leq 25$, $80 \leq x \leq 100$, $0 \leq y \leq 20$, $0 \leq z \leq 20$, $0 \leq w \leq 20$, with $a+b+c+d=100$ and $x+y+z+w=100$.

3. The magnetic head as claimed in claim 1 wherein the magnetic film is formed of an amorphous magnetic material and wherein magnetostatic coupling of the magnetic films is maintained even at a temperature exceeding 400° C.

4. The magnetic head as claimed in claim 3 wherein the amorphous magnetic film is formed of an amorphous material mainly formed of Co and containing at least one element selected from the group consisting of Zr, Mo, Pd, Ta, Nb, Ti and Hf.

5. The magnetic head as claimed in claim 4 wherein the non-magnetic film is formed of Pt.

6. The magnetic head of claim 1, wherein the magnetic films are made of amorphous alloys having the compositional formula $Co_aZr_bNb_cTa_d$, where a, b, c and d represent proportions of respective elements, and the ranges of the proportions are $68 \leq a \leq 90$, $0 \leq b \leq 10$, $0 \leq c \leq 20$ and $0 \leq d \leq 10$, with $a+b+c+d=100$.

7. The magnetic head of claim 1, wherein the non-magnetic films oxide film are selected from the group consisting of $SiO_2$, $ZrO_2$ and $Ta_2O_5$.

8. The magnetic head of claim 1, wherein the non-magnetic film nitride films are selected from the group consisting of $Si_3N_4$, FaN and TiN.

9. A magnetic head comprising a pair of magnetic core halves, each having a magnetic core film sandwiched between a pair of non-magnetic substrates, said magnetic core halves being abutted to each other with faces of the magnetic core fills facing each other with a magnetic gap being defined in an interface of abutment of said magnetic core films, wherein the improvement resides in that:

said magnetic core film is of a laminated magnetic film structure comprising a plurality of laminated film units laminated with insulating films in-between, each laminated magnetic film unit in turn comprising a plurality of magnetic films with non-magnetic films in-between, the magnetic films being magnetostatically connected to one another at film ends, said magnetic films being of a thickness to provide magnetostatic coupling of said magnetic films, and said non-magnetic films being of a thickness to allow the magnetic films juxtaposed with opposite sides with said non-magnetic film to assume anti-parallel magnetizations, each of the magnetic films having a film thickness of 0.1 to 1.0 μm, each of the non-magnetic films having a film thickness of 0.1 to 20 nm, each of the insulating films being thicker than each of the magnetic films and the non-magnetic film, the magnetic films being selected from the group consisting of (1) materials having a structural formula $(Fe_aRu_bGa_cSi_d)_xN_yO_zC_w$, where a, b, c, d, x, y, z and w represent the proportions of respective elements in atomic percent, and having the composition such that $68 \leq a \leq 90$, $0.1 \leq b = 10$, $0.1 \leq c \leq 15$, $10 \leq d \leq 25$, $80 \leq x \leq 100$, $0 \leq y \leq 20$, $0 \leq z \leq 20$, $0 \leq w \leq 20$, with $a+b+c+d=100$ and $x+y+z+w=100$, and (2) amorphous alloys having the compositional formula $Co_aZr_bNb_cTa_d$, where a, b, c and d represent proportions of respective elements, and the ranges of the proportions are $68 \leq a \leq 90$, $0 \leq b \leq 10$, $0 \leq c \leq 20$ and $0 \leq d \leq 10$, with $a+b+c+d=100$, the non-magnetic films being selected from the group consisting of Pt, Au, Cu, Cr, oxide films and nitride films.

10. A magnetic head comprising a pair of magnetic core halves, each having a magnetic core film sandwiched between a pair of non-magnetic substrates, said magnetic core halves being abutted to each other with faces of the magnetic core films facing each other with a magnetic gap being defined in an interface of abutment of said magnetic core films, wherein the improvement resides in that:

said magnetic core film is of a laminated magnetic film structure comprising a plurality of laminated film units laminated with insulating films in-between, each laminated magnetic film unit in turn comprising a plurality of magnetic films with non-magnetic films in-between, the magnetic films being magnetostatically connected to one another at film ends, said magnetic films being of a thickness to provide magnetostatic coupling of said magnetic films, and said non-magnetic films being of a thickness to allow the magnetic films juxtaposed with opposite sides with said non-magnetic film to assume anti-parallel magnetizations, each of the magnetic films having a film thickness of 0.1 to 1.0 μm, each of the non-magnetic films having a film thickness of 0.1 to 20 nm, each of the insulating films being thicker than each of the magnetic films and the non-magnetic films, the magnetic films being formed of materials selected for the group consisting of Fe-Al-Si alloys, Fe-Si-Co alloys, Fe-Ni alloys, Fe-Al-Ge alloys, Fe-Ga-Ge alloys, Fe-Si-Ge alloys, Fe-Si-Ga alloys, Fe-Si-Ga-Ru alloys, Fe-Co-Si-Al alloys and amorphous magnetic materials mainly formed of cobalt CO and containing at least one element selected from the group consisting of Zr, Mo, Pd, Ta, Nb, Ti and Hf, and the non-magnetic film being formed of Pt.

* * * * *